United States Patent [19] | [11] 3,757,051
Girard et al. | [45] Sept. 4, 1973

[54] REGENERATIVE REPEATER FOR PCM SIGNALS TRANSMITTED IN THE ALTERNATE POLARITY MODE

[75] Inventors: Pierre Girard, Paris; Claude P. H. Lerouge, Maurepas; Marc A. Regnier, Aulnay-sous-Bois, all of France

[73] Assignee: International Standard Electric Corporation, New York, N.Y.

[22] Filed: Nov. 23, 1971

[21] Appl. No.: 201,557

[52] U.S. Cl. ............ 179/15 AD, 178/70 R, 325/13, 328/164, 179/170 R
[51] Int. Cl. ............ H04b 3/38
[58] Field of Search ............ 179/15 AD, 16 EA, 179/16 E, 170 R, 170 T; 178/70 R, 70 TS; 325/13; 328/164

[56] References Cited

UNITED STATES PATENTS

| | | | |
|---|---|---|---|
| 3,651,265 | 3/1972 | Van Der Houwen | 178/70 R |
| 2,953,641 | 9/1960 | Carver | 178/70 R |
| 3,475,556 | 10/1969 | Sasari | 328/164 |
| 3,355,549 | 11/1967 | Alexander | 179/15 AD |
| 3,452,220 | 6/1969 | Fritschi | 179/16 E |

*Primary Examiner*—William C. Cooper
*Assistant Examiner*—Thomas D'Amico
*Attorney*—C. Cornell Remsen, Jr., Menotti J. Lombardi, Jr. et al.

[57] ABSTRACT

A regenerative repeater for alternate polarity PCM signals is disclosed that does not require an equalizer or amplifier. The PCM signals are directly detected by (1) determining whether the slope of the pulse is greater or less than a reference value and (2) if its polarity is opposite to that of the preceding pulse. The detected signals are reshaped by a monostable multivibrator and are retimed by a phase-locked loop. The repeater is completely digital except for the slope comparator.

8 Claims, 8 Drawing Figures

Inventors
PIERRE GIRARD
CLAUDE P. H. LEROUGE
MARC A. REGNIER
By Philip M. Bolton
Attorney Inventors
PIERRE GIRARD
CLAUDE P. H. LEROUGE
MARC A. REGNIER
By Philip M. Bolton
Attorney Inventors
PIERRE GIRARD
CLAUDE P. H. LEROUGE
MARC A. REGNIER
By Philip M. Bolton
Attorney

REGENERATIVE REPEATER FOR PCM SIGNALS TRANSMITTED IN THE ALTERNATE POLARITY MODE

BACKGROUND OF THE INVENTION

The present invention relates to an improved regenerative repeater for a pulse code modulation (PCM) system in which the transmission of signals is according to the "alternate polarity" process.

The process consists of representing the ones (1) of a binary code by pulses alternatively positive (+ level) and negative (− level) and the zeroes (0) of a binary code by a zero level. This process results in an average value of the D.C. level on the line equal to zero.

It is known that any transmission line behaves like a low-pass filter introducing amplitude and phase distortions so that standard repeaters for alternate polarity pulses comprise, at the input of each repeater, an equalizer which has such a characteristic that these distortions are compensated for in the useful bandwidth. The signals are then applied to an amplifier, to a symmetrical rectifier and, at last to an amplitude discriminator, the threshold of which is set so that it discriminates between 1's and 0's.

It is understood that, in this process, the equalizer may not compensate for all the distortions. Moreover, the amplifier itself must not introduce any distortions and, particularly, it must never be saturated. At last, it is imperative that the detection threshold of the amplitude discriminator be set according to the noise level present on the line.

SUMMARY OF THE INVENTION

The repeater according to the present invention does not use any equalizer or amplifier and the received signals, the average level of which is about 20 mv, are directly applied to a "slope coder" operating in a way similar to that of a delta coder. It is known that the low-pass filter characteristic of the transmission line creates different distortions on the leading and the trailing edges of the signals (PCM pulses) so that the slope of the leading edge of a pulse is steeper than that of the trailing edge, this being generally true even for two consecutive pulses having respectively the + and the − levels. Therefore, a first detection algorithm has been chosen which decides that a digit 1 has been received each time the slope P of the signal is greater than a reference value Po which is adjustable and which depends on the length and on the characteristic of the line.

Alternate polarity signals can be transmitted according to two processes: the "full-baud" process in which a level signal or pulse + or − fills a whole time-slot and the "half-baud" process in which such a signal or pulse fills half a time-slot. Actually it may happen that, in full-baud modulation, the trailing edge of a + signal or pulse has the same slope as the leading edge if said signal or pulse is immediately followed by a − signal. To provide a correct discrimination, a second detection algorithm is used in which a signal or pulse having a slope greater than Po represents a digit 1 only if its polarity is opposed to that of the signal or pulse previously detected as being a digit 1.

The repeater according to the invention accepts, on its input, signals modulated according to one or the other process without any alteration. For the output, a manual switching operation enables the transmission of either full-baud or half-baud signals or pulses.

An object of the present invention is to provide a regenerative repeater for PCM signals modulated according to the alternate polarity process which handles either half or full-baud signals or pulses.

Another object of the present invention is to provide a repeater having neither an amplifier nor an equalizer.

A feature of the present invention is the provision of a regenerative repeater for PCM signals transmitted in the alternate polarity mode comprising a first source of distorted alternate polarity type PCM pulses; a second source of local timing signals; first means coupled to the first and second sources to produce a regenerated version of the distorted PCM pulses and a polarity indicating signal, the regenerated version of the distorted PCM pulses being produced when the value of the slope on an edge of a present one of the distorted PCM pulses is greater than a reference value and when the polarity of the present one of the distorted PCM pulses is opposite to the polarity of an immediately preceding one of the distorted PCM pulses; second means coupled to the first means and the second source to phase lock the timing signals to the regenerated version of the distorted PCM pulses; and third means coupled to the first means and the second source to transmit as the repeater output signal a retimed and regenerated version of the distorted PCM pulses according to the alternate polarity mode.

Consequently, in a repeater for signals or pulses transmitted in alternate polarity there are provided, according to a characteristic of the invention, differential coding means for the input signals which supply a signal D each time the slope of said signals, measured during a predetermined time interval, is greater than a given value, means to generate, in synchronism with said signals D, signals M characterizing the time base HJ of the input signals, means for performing the phase locking of this time base HG with the local time base HL and means for transmitting a regenerated signal synchronized with the time base HL each time a signal M is present, the polarity of the transmitted signals being alternately positive and negative.

According to another characteristic of the invention, there are provided memory means constituted by a flip flop B2 which toggles under the control of each signal D so that its state characterizes the polarity of the next signal to transmit, means for selecting the polarity of the signal to be transmitted and comprising two flip-flops A1 and A2 which are in the 0 state when no signal must be transmitted, means to control the setting to the 1 state of the flip-flop A1 (A2) when a signal M is present and when the flip-flop B2 is in the 0 (1) state, means for transmitting a positive (negative) regenerated signal when the flip-flop A1 (A2) is in the 1 state, said latter means being activated either by a signal of the time base HL having a duration equal to half a time slot for half-baud transmission, or by a permanent signal for a full-baud transmission and means for controlling, at the end of the time slot, the resetting to the 0 state of the flip-flop A1 or A2 which is in the 1 state.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

The repeater according to the invention is designed for a transmission system in which the signals are transmitted according to the "alternate polarity" process. In this process, a pseudo-ternary coding with the + and − levels is used, the algorithm for translating from a two-level binary code to this pseudo-ternary code is the following: 1. a binary zero (0) is represented by the level zero, and 2. binary ones (1) are alternately represented by the + and − levels.

It is known that this process, as well as many others, enables doubling the quantity of information transmitted on a given line, but it presents the additional advantage that the average value of the DC level of the transmitted signals is equal to zero.

Figure 1:
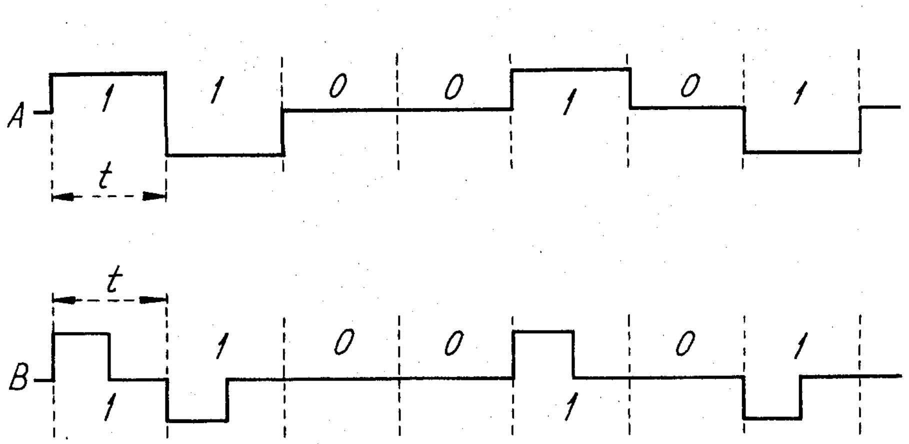
FIG. 1 illustrates PCM pulses transmitted according to the full-baud process in Curve A and according to the half-baud process in Curve B.

Curves A and B of FIG. 1 illustrates two variants of alternate polarity transmission, the duration of a time slot being references t. Curve A illustrates signals transmitted according to the full-baud process by a sending terminal, each of the + and − levels occupy a full time slot. Curve B illustrates signals transmitted according to the half-baud process in which a level + or − occupates half a time slot.

The repeater according to the invention operates upon, without modification, input signals modulated according to both processes.

Figure 2:
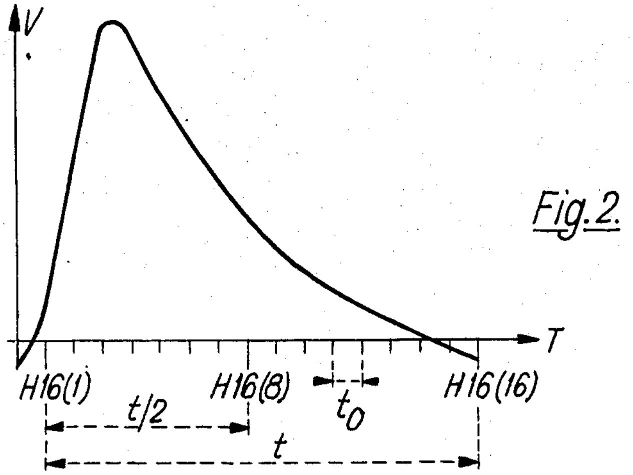
FIG. 2 illustrates a signal (pulse) of period t received at the input of the repeater.

FIG. 2 illustrates a signal (a pulse) of period t received at the input of the repeater.

It is known that a transmission line presents the characteristic of a low-pass filter. It results that the edges of the pulses are rounded and that their trailing edges generally present a "slewing" with respect to the leading edges, which means that their slope is smaller than that of said leading edges. Practically the ratio of the slopes can have rather high values, especially in half-baud modulation.

Figure 3:
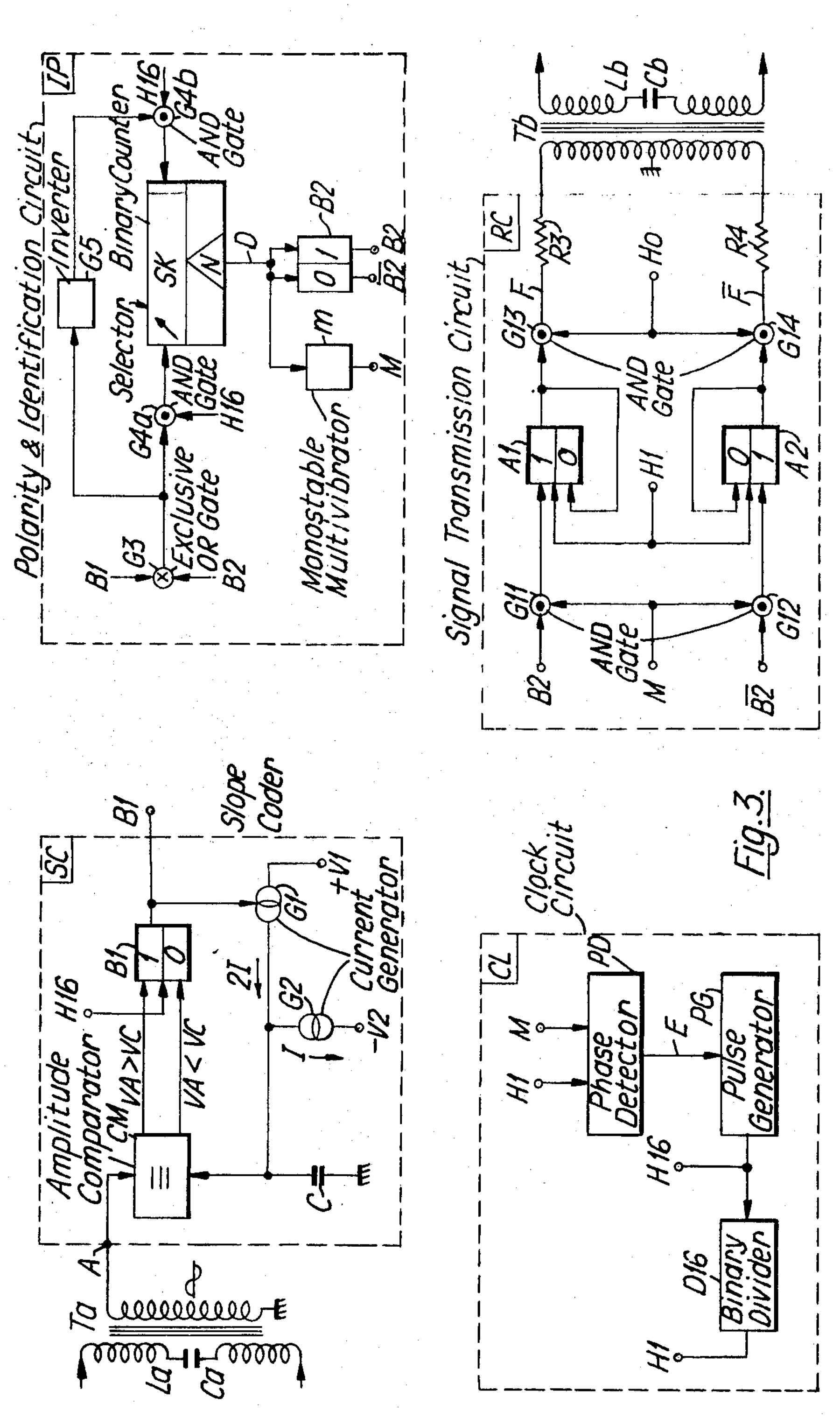
FIG. 3 illustrates in schematic diagram block form the repeater according to the principles of the present invention.

FIG. 3 illustrates in schematic block diagram form the detailed diagram of the repeater of the present invention which comprises the following elements:

1. The slope coder SC and the circuit IP for polarity detection and identification, the combination of these two circuits assure the detection of the received signals;

2. The clock circuit CL assuming the retiming of the detected signals. This circuit, which will be described below, supplies, in particular, signals H16 whose repetition period is very short with respect to the period of the received signals and signals H1 whose repetition period is equal to the received signals, and 3. The signal transmission circuit RC.

The repeater is connected to the input line La by the transformer Ta and to the output line Lb by the transformer Tb. The windings on the line side of these transformers are realized in two parts connected by the capacitors Ca, Cb in order to supply the lines with direct current, this direct current power providing as is well known the power supply for the repeater.

The slope coder SC comprises:

1. The amplitude comparator CM, the two inputs of which are, respectively, connected to the point A of the transformer Ta and to the capacitor C, the voltages at these points being referenced VA and VC. It comprises, as shown in FIG. 3, a first output on which a signal appears if VA > VC, and a second output on which a signal appears if VA < VC. 2. The JK flip-flop B1 controlled by the signals supplied by the comparator CM, this control being effective when a clock signal H16 is present at the clocking input of flip flop B1. 3. The current generators G1 and G2, respectively, powered with voltages +V1 and −V2 and the common point of which is connected to the capacitor C. The generator G2 operates continuously and supplies a current I. The generator G1 supplies a current 2I when triggered by the 1 output of flip-flop B1.

It is thus seen that:

1. For the logical condition B1, the capacitor C is charged by a constant current I so that the voltage VC becomes more positive; and 2. For the logical condition $\overline{B1}$, the capacitor C is discharged by a constant current I so that the voltage VC becomes more negative.

The table hereinbelow summarizes the operation conditions of this circuit SC.

Operation conditions of the slope coder SC

| Initial condition | State controlled by a signal H16 | VC | Final condition |
|---|---|---|---|
| VA<VC | $\overline{B1}$ | decreases | VA>VC |
| VA>VC | B1 | increases | VA<VC |

It is seen from this table that the voltage VC always goes towards VA. When, for example, VA > VC, the flip-flop B1 is set in the 1 state and the voltage VC increases, at each period of the signal H16, by a value V = $(I)(t_o/C)$. When VA < VC, the flip-flop B1 is reset to the 0 state and oscillates thereafter between the 0 and 1 states.

Figure 4:
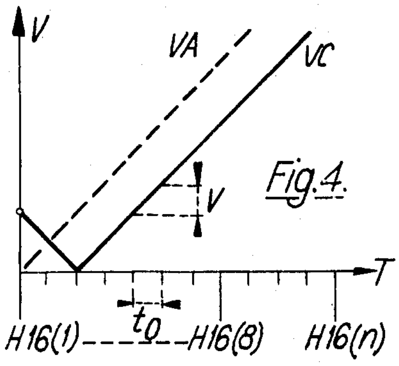
FIG. 4 illustrates the relation of the voltages VA and VC for an edge of a pulse having a steep slope.
Figure 5:
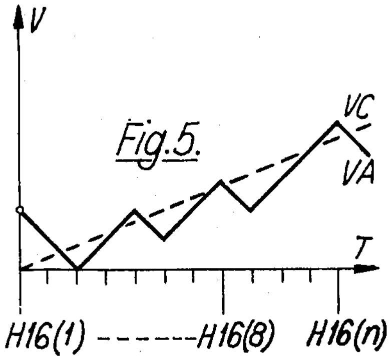
FIG. 5 illustrates the relation of the voltages VA and VC for an edge of a pulse having a small slope signal.

FIGS. 4 and 5 illustrate the values, with respect to the time T [signals H16 (1) to H16 ($n$)], of the voltages VA and VC, it being assumed that, at the time H16 (1), VC > VA. At each time interval of duration $t_o$, the voltage VC varies by a value V, in a direction indicated in the above table.

FIG. 4 illustrates the case when the voltage VA represents the leading edge of a pulse having a relatively steep slope. It is seen that, after a settling phase of the voltage VC, the flipflop B1 stays permanently in the 1 state.

FIG. 5 illustrates the case where the voltage VA increases with a rather small slope. It is seen that, in this case, the flip-flop B1 toggles between the 1 and 0 states.

When looking at FIG. 4, it is seen that a given value of V, which depends as has been seen above upon I and C, defines a minimal slope value ($VA/t_o$) such that, for signals having a slope greater than this value, the flip-fop B1 always stays in the 1 state.

It should be understood that this is also true for negative signals, the flip-flop then always remaining in the 0 state for slope values greater, in absolute value, than said minimal slope.

The circuit SC, therefore, measures the slope of the received signals.

The signal detection and polarity identification circuit IP comprises:

1. The EXCLUSIVE OR gate G3, the AND gates G4*a*, G4*b* and the inverter G5;
2. The selector SK comprising a N-position or stage counter and a decoder delivering a signal D when the counter is full, the signal D characterizing the fact that a level + or − has been detected;
3. The polarity flip-flop B2 of the RS type which is used as a scale-of-two counter controlled by the signals D; and
4. The monostable multivibrator M which delivers a signal of duration $t/2$ when the selector SK delivers a signal D.

It is seen that, at each time slot H16, the selector SK:

1. Advances by one position or stage when the states of the flip-flops B1 and B2 are different through means of gates G3 and G4*a;* and
2. Is cleared when the states of flip flops B1 snd B2 are identical through means of gates G3 and G4b and inverter G5.

To describe the operation of selector SK, it will be assumed that the flip-flop B2 is initially in the 0 state.

If the slope of the first signal received on the line La is steep enough, and if the voltage VA is negative (level −), the flip-flop B1 is set to the 0 state and remains there. The counter of selector SK cannot advance and the flip-flop B2 remains in the 0 state.

The following signal is positive (level +) and, if its slope is steep enough, the flip-flop B1 is set to the 1 state and remains in this state during a succession of signals H16. The EXCLUSIVE OR gate G3 permanently delivers a signal and each one of the N first signals H16 controls the advance by one position of the counter of selector SK until a signal D appears at the output of the decoder. Signal D controls the setting of the flipflop B2 to the 1 state and the generation of a signal M.

The value of the number N and of the current I (generators G1 and G2 of the circuit SC) are so chosen that the duration $(N)(t_o)$ (detection delay of a message signal) is shorter than the rise time of the signal. Therefore, the trailing edge of said signal starts only after a certain delay and, as its slope is small, the flip-flop B1 does not remain in the same state during a time $(N)(t_o)$. The counter of selector SK, therefore, receives a series of clearing signals.

If the following input signal is negative (level −), the same process takes place but the flip-flop B1 remains in the 0 state if the slope is steep enough. Thus, the EXCLUSIVE OR gate G3 delivers signals and, after a delay $(N)(t_o)$, the flip-flop B2 is reset to the 0 state.

It is thus seen that the flip-flop B2 identifies the polarity of the signals detected by the circuits SC and IP.

Figure 6:
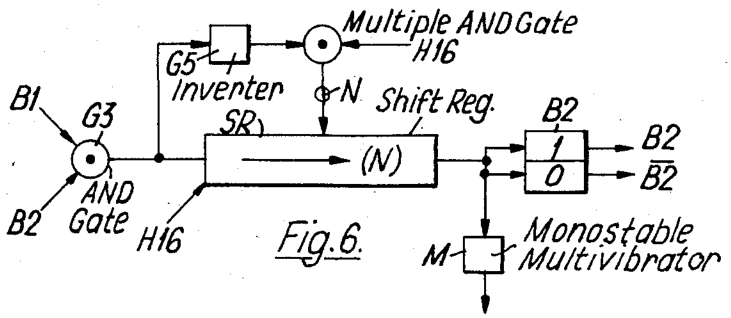
FIG. 6 illustrates a variant of the polarity identification circuit of FIG. 3.

FIG. 6 illustrates an alternative of the circuit IP which employs a N-stage shift-register SR comprising a series input and a series output together with N parallel clearing inputs.

Figure 7:
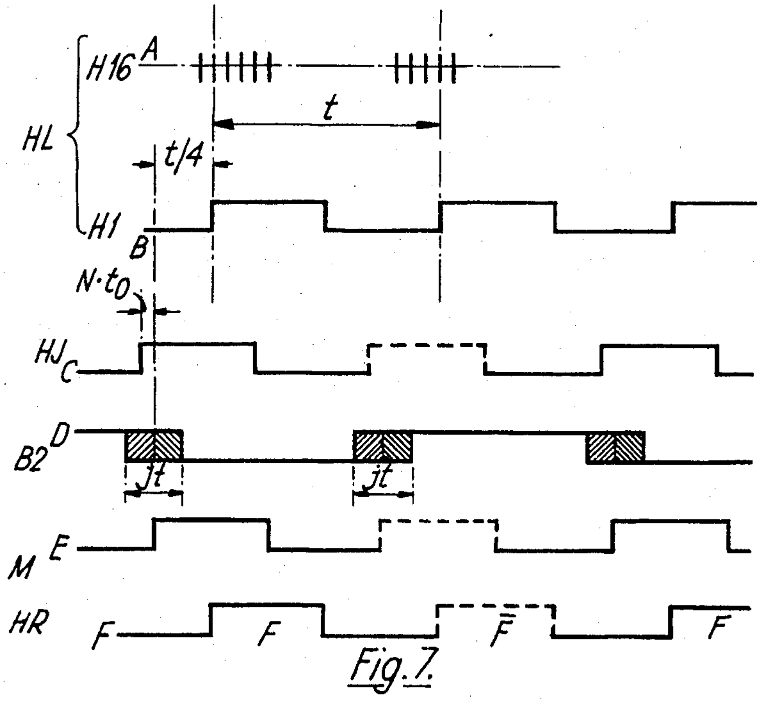
FIG. 7 illustrates a timing diagram of various signals in the repeater of FIG. 3.

FIG. 7 illustrates in Curves A-F signals present at different points in the repeater. Particularly Curve C illustrates the theoretical shapes of the signals of the time base HJ (input signals received on the line La) in the case when a series of digits 1 is transmitted according to the half-baud process. The + level signals are represented by full lines and the − level signals by dotted lines in Curves C, E and F, FIG. 7.

As it has been noted hereinabove a message signal detected with a delay $(N)(t_o)$ controls:

1. The switching of the flip-flop B2 (Curve D, FIG. 7); and
2. The generation of a signal M (Curve E, FIG. 7). These signals M are always + level signals.

The phase jitter of amplitude Jt which affects the leading edges of signals HJ, B2 and M is illustrated, by hatching, only in Curve D, FIG. 7.

The clock circuit CL (FIG. 3) comprises:

1. The pulse generator PG delivering signals H16 of repetition period $t_o$ (Curve A, FIG. 7);
2. The divide by 16 binary divider D16 supplying signals H1 of period $t$ (Curve B, FIG. 7) equal to the theoretical duration of a time slot on the line La, (the signals H16 and H1 defining the local time base HL); and
3. The phase detector PD which compares the signals H1 and M.

Figure 8:
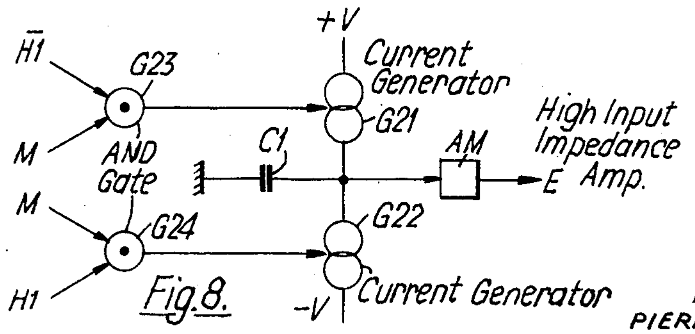
FIG. 8 illustrates the detailed block diagram of the phase detector of FIG. 3.

FIG. 8 illustrates a detailed block diagram of circuit PD which has been described in U. S. Pat. No. 3,470,488 and which comprises the AND gates G23, G24, the capacitor C1 and the high input impedance amplifier AM. The gates G23, G24 are, respectively, controlled by the logical conditions $\overline{H1}\cdot M$ and $H1\cdot M$ and it is understood that the output voltage E of the amplifier AM is constant when the signals H1 and M are in phase quadrature.

This voltage E is applied to the generator PG and acts in such a way that the beat frequency between the compared signals tends to become equal to zero.

There is achieved a phase lock loop to provide synchronization between time bases HJ and HL, with a phase difference of $t/4 + (N)(t_o)$, between these two time bases, if the duration of the signal M is equal to $t/2$.

By comparing Curves B and C, FIG. 7, it is noted that for this example HL has been adjusted so that it lags with respect to HJ.

The transmission circuit RC comprises the JK or "Master-Slave" flip-flops A1 and A2, the AND gates G11 to G14 and the resistors R3 and R4.

As set forth hereinabove when describing the circuit IP, the state of the flip-flop B2 changes at the reception of each message signal and, therefore, indicates the polarity of the regenerated signal to be transmitted. It should be understood that if several 0 digits are successively received, flip-flop B2 does not toggle and, therefore, a signal must only be transmitted if the monostable multivibrator M supplies a signal.

The transmission conditions (polarity) of a regenerated signal are controlled by the AND circuits G11 and G12 and are registered in the flip-flops A1 and A2 according to the following logic equations:

$$B2\cdot M\cdot H1 \longrightarrow A1$$

$$B2\cdot M\cdot H1 \longrightarrow A2$$

(the sign      symbolizing the control of a flip-flop).

It is assumed that flip-flops A1 and A2 are initially in the 0 state.

When a signal M is present, the first signal H1, used as clock signal of the flip-flops, controls the setting to the 1 state of one of the flipflops, for instance, the flip-flop A1. As the output 1 of each of these flip-flops is connected to its 0 input, the next signal H1 controls the resetting to the 0 state of the flip-flop A1 and, eventually, the setting to the 1 state of A2 if a signal M is present at this time.

It is thus seen that, when one of these flip-flops is set to the 1 state it remains in this state during a whole time slot.

The AND gates G13 and G14, which are activated by a signal HO, define the duration of the signals transmitted on the line Lb.

If transmission is desired according to the half-baud process HO = H1. The output signals are then those represented Curve F, FIG. 7 in which the + levels are illustrated in full line and the − levels are illustrated in dotted line.

If transmission is desired according to the full-baud process, the signal HO is a high logic level permanently applied to the AND gates G13 and G14.

It should be noted, when examining Curve E, FIG. 7, that a signal M of duration $t/2$ controls a correct switching of the flip-flop A1 or A2 for a maximal value of phase jitter $Jt(max) = t/4$.

While we have described above the principles of our invention in connection with specific apparatus it is to be more clearly understood that this description is made only by way of example and not as a limitation to the scope of our invention as set forth in the objects thereof and in the accompanying claims.

We claim:

1. A regenerative repeater for PCM signals transmitted in the alternate polarity mode comprising:

a first source of distorted alternate polarity type PCM pulses;

a second source of local timing signals;

said local timing signals including at least a first timing signal having a first given repetition rate, and a second timing signal having a second given repetition rate equal to a given multiple of said first repetition rate;

first means coupled to said first and second sources to produce a regenerated version of said distorted PCM pulses and a polarity indicating signal, said regenerated version of said distorted PCM pulses being produced when the value of the slope of an edge of a present one of said distorted PCM pulses is greater than a reference value and when the polarity of said present one of said distorted PCM pulses is opposite to the polarity of an immediately preceding one of said distorted PCM pulses;

said first means including second means coupled to said first and second sources responsive to said distorted PCM pulses and said second timing signal to provide a first output signal having a characteristic determined by said value of said slope relative to said reference value, and third means coupled to said second means and said second source responsive to said second timing signal and said first output signal to provide said polarity indicating signal and said regenerated version of said distorted PCM pulses;

fourth means coupled to said third means and said second source, said fourth means being responsive to said regenerated version of said distorted PCM pulses and said first timing signal to phase lock said timing signals to said regenerated version of said distorted PCM pulses; and fifth means coupled to said third means and said second source, said fifth means being responsive to said polarity indicating signal, said regenerated version of said distorted PCM pulses and said first timing signal to transmit as said repeater output signal a retimed and regenerated version of said distorted PCM pulses according to said alternate polarity mode.

2. A repeater according to claim 1, wherein said fourth means includes a phase detector coupled to said third means and said second source responsive to said regenerated version of said distorted PCM pulses and said first timing signal to phase lock said first and second timing signals to said regenerated version of said distorted PCM pulses and provide a given time delay between said first timing signal and said regenerated version of said distorted PCM pulses.

3. A repeater according to claim 1, wherein said second means includes a third source to provide said reference value, an amplitude comparator coupled to said first source and said third source, said comparator having a first output and a second output, said first output having a second output signal thereon when said value of said slope is greater than said reference value and said second output having a third output signal thereon when said value of said slope is less than said reference value, and a first JK flip flop having its clock input coupled to said second source responsive to said second timing signal, its binary 1 input coupled to said first output and its binary 0 input coupled to said second output.

4. A repeater according to claim 3, wherein said third source includes a capacitor having one terminal coupled to ground and the other terminal coupled to said amplitude comparator, a first current generator producing a first given value of current coupled between a given negative voltage and said other terminal of said capacitor, and a second current generator producing a second given value of current equal to twice said first given value of current coupled between a given positive voltage and said other terminal of said capacitor, said second generator being coupled to the 1 output of said first JK flip flop for controlling when said second given value of current is coupled to said capacitor.

5. A repeater according to claim 3, wherein said third means includes an RS flip flop to provide said polarity indicating signal, a monostable multivibrator to provide said regenerated version of said distorted PCM pulses, an N-stage counter and decoder unit having a counting input, a clearing input and an output coupled to control said RS flip flop and said monostable multivibrator, an EXCLUSIVE OR gate coupled to the 1 output of said RS flip flop and the 1 output of said first JK flip flop, a first two input coincidence device having its output coupled to said counting input of said unit, one of said two inputs coupled to the output of said EXCLUSIVE OR gate and the other of said two inputs coupled to said second source responsive to said second timing signal, an inverter having an output and an input coupled to the output of said EXCLUSIVE OR gate, and a second two input coincidence device having its output coupled to said clearing input of said unit, one of said two inputs coupled to said output of said inverter and the other of said two inputs coupled to said second source responsive to said second timing signal.

6. A repeater according to claim 5, wherein said third means includes a fifth two input coincidence device having an output, one of said two inputs coupled to the 1 output of said RS flip flop and the other of said two inputs coupled to the output of said monostable multivibrator, a fourth two input coincidence device having an output, one of said two inputs coupled to the 0 output of said RS flip flop and the other of said two inputs coupled to the output of said monostable multivibrator, a second JK flip flop having its 1 input coupled to said output of said third coincidence device, its 0 input coupled to its own 1 output and its clock input coupled to said second source responsive to said first timing signal, a third JK flip flop having its 1 input coupled to said output of said fourth coincidence device, its 0 input coupled to its own 1 output and its clock input coupled to said second source responsive to said first timing signal, a fourth source of signal having a first characteristic to provide half baud transmission of said repeater output signal and a second characteristic to provide full baud transmission of said repeater output signal, a fifth two input coincidence device having an output, one of said two inputs coupled to the 1 output of said second JK flip flop and the other of said two outputs coupled to said fourth source, a sixth two input coincidence device having an output, one of said two inputs coupled to the 1 output of said third JK flip flop and the other of said two outputs coupled to said fourth source, and sixth means coupled to said output of said fifth and sixth coincidence device to combine the output signals therefrom to provide said repeater output signal.

7. A repeater according to claim 3, wherein said third means includes an RS flip flop to provide said polarity indicating signal, a monostable multivibrator to provide said regenerated version of said distorted PCM pulses, an N-stage shift register having a storage input, N clearing inputs and an output coupled to control said RS flip flop and said monostable multivibrator, a first two input coincidence device having its output coupled to said storage input of said register, one of its inputs coupled to the 1 output of said RS flip flop and the other of its inputs coupled to the 1 output of said first JK flip flop, an inverter coupled to the output of said first coincidence device, and a second two input coincidence device having one of its two inputs coupled to the output of said inverter, the other of its two inputs coupled to said second source responsive to said second timing signal and N output, each of said N outputs being coupled to a differnt one of said N clearing inputs of said register.

8. A repeater according to claim 7, wherein said fifth means includes a third two input coincidence device having an output, one of said two inputs coupled to the 1 output of said RS flip flop and the other of said two inputs coupled to the output of said monostable multivibrator, a fourth two input coincidence device having an output, one of said two inputs coupled to the 0 output of said RS flip flop and the other of said two inputs coupled to the output of said monostable multivibrator, a second JK flip flop having its 1 input coupled to said output of said third coincidence device, its 0 input coupled to its own 1 output and its clock input coupled to said second source responsive to said first timing signal, a third JK flip flop having its 1 input coupled to said output of said fourth coincidence device, its 0 input coupled to its own 1 output and its clock input coupled to said second source responsive to said first timing signal, a fourth source of signal having a first characteristic to provide half baud transmission of said repeater output signal and a second characteristic to provide full baud transmission of said repeater output signal, a fifth two input coincidence device having an output, one of said two inputs coupled to the 1 output of said second JK flip flop and the other of said two outputs coupled to said fourth source, a sixth two input coincidence device having an output, one of said two inputs coupled to the 1 output of said third JK flip flop and the other of said two outputs coupled to said fourth source, and sixth means coupled to said output of said fifth and sixth coincidence device to combine the output signals therefrom to provide said repeater output signal.

* * * * *

UNITED STATES PATENT OFFICE
CERTIFICATE OF CORRECTION

Patent No. 3,757,051 Dated Sept. 4, 1973

Inventor(s) Pierre Girard, Claude P. H. Lerouge, Marc A. Regnier

It is certified that error appears in the above-identified patent and that said Letters Patent are hereby corrected as shown below:

On the Front Page between " [21] Appl. No.: 201,557" and " [52] U.S. Cl. 179/15AD, 178/70R, 325/13," insert -- [30] Foreign Application Priority Data November 30, 1970 France 70 42942--.

Signed and sealed this 1st day of January 1974.

(SEAL)
Attest:

EDWARD M.FLETCHER,JR.
Attesting Officer

RENE D. TEGTMEYER
Acting Commissioner of Patents